(12) United States Patent
Dietz

(10) Patent No.: US 6,950,600 B2
(45) Date of Patent: Sep. 27, 2005

(54) EXPONENTIAL STORAGE SYSTEM AND METHOD

(75) Inventor: Paul H. Dietz, Hopkinton, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 962 days.

(21) Appl. No.: 09/840,334

(22) Filed: Apr. 23, 2001

(65) Prior Publication Data

US 2002/0197054 A1 Dec. 26, 2002

(51) Int. Cl.[7] .......................... H04N 5/91; H04N 5/85; H04N 5/781
(52) U.S. Cl. .................... 386/46; 386/125; 386/124
(58) Field of Search ........................ 386/46, 40, 45, 386/52, 92, 55, 64, 107, 117, 124, 125, 1; 348/143

(56) References Cited

U.S. PATENT DOCUMENTS

| | | | |
|---|---|---|---|
| 4,829,389 A | 5/1989 | Fukuda | 360/73 |
| 6,011,901 A | 1/2000 | Kirsten | 386/123 |
| 6,115,536 A * | 9/2000 | Iwasaki et al. | 386/106 |
| 6,144,797 A | 11/2000 | MacCormack et al. | 386/46 |
| 2002/0005895 A1 * | 1/2002 | Freeman et al. | 348/143 |

* cited by examiner

*Primary Examiner*—Robert Chevalier
(74) *Attorney, Agent, or Firm*—Dirk Brinkman; Andrew J. Curtin

(57) ABSTRACT

A system records a sequence of frames of a video in circular buffers. Each buffer is configured to store the frames in a sequential order. Disjoint sets of frames are selected from the video. There is one set of frames for each buffer such that a first set selects a first fraction of the frames, each subsequent set of frames is a smaller fraction then a previous set of frames, and a last set of selected frames includes remaining frames. The sets of frames are stored sequentially in the corresponding buffers.

7 Claims, 1 Drawing Sheet

EXPONENTIAL STORAGE SYSTEM AND METHOD

FIELD OF THE INVENTION

This invention relates to the recording of videos, and more particularly to time-lapses surveillance videos.

BACKGROUND OF THE INVENTION

Video systems are widely use to record significant events. For example, surveillance systems use video systems to record unusual behavior by individuals or machinery. Most conventional single-camera and multi-camera surveillance systems use video tape recorders (VTR) in the VHS format of video cassette recorders (VCR). Because such recorders can only store a relatively small number of images, about 432,000, they are designed to provide a maximum recording time of about four hours, at thirty frames per second.

However, surveillance systems are intended to record events over essentially an unlimited amount of elapsed time, i.e., twenty-four hours a day, seven days a week, year in, year out. The ability to record events for larger number of hours can be achieved by time-lapse recording of still images. This reduces both the amount of recording media, and review time. In time-lapse recording scenes are recorded at reduced frame rates.

However, large surveillance systems, with hundreds or more cameras, still have a problem with processing and maintaining huge amounts of recording media, and the media is frequently recycled. If too much time has passed, then images desired, perhaps a year later, may have been erased. In addition, tape life is on the order of about twenty cycles, so more frequent cycling results in faster image degradation due to tape wear.

One could, of course record at a much lower frame rate. However, this is undesirable because short term events may be missed, for example, a fleeting glimpse of a face in a crime scene. Current video surveillance systems force the user to select a single compromise frame rate that inherently trades recording time against temporal resolution.

Rather than choosing a single frame rate, a user may prefer to specify a higher frame rate for a recent recording, and a lower frame rate for an older recording, thus optimizing the use of storage media. As frames age, some fraction of the frames can be erased, and the recovered media can be used for a new recording. This technique can be extended to allow many different frame rates, each decreasing with the age of the recording, see U.S. patent application Ser. No. 09/504,721 "Gray Code Data Storage," filed by Freeman et al., on Feb. 16, 2000.

However, that method depends on two features which are not generally available, a random access memory, and identically sized frames. If the recording media is tape, analog or digital, random access is extremely inefficient. Although hard disk drives allow much faster random access, the additional seek time dramatically lowers the potential frame rate of the recorder. Furthermore, digital videos are often compressed using, for example, MPEG-2, resulting in varying frame sizes depending on distortion and rate parameters. It is possible to record with fixed size compressed frames, but that would be an inefficient use of memory.

Therefore, there is a need for a recording system that can store events recorded over a long period of time, and that can recycle storage using sequential accesses.

SUMMARY OF THE INVENTION

The invention provides a system for recording a sequence of frames of a video in circular buffers. Each buffer is configured to store the frames in a sequential order. Disjoint sets of frames are selected from the video. There is one set of frames for each buffer such that a first set selects a first fraction of the frames, each subsequent set of frames is a smaller fraction then a previous set of frames, and a last set of selected frames includes remaining frames. The sets of frames are stored sequentially in the corresponding buffers. In one application the frames are of a time-lapsed surveillance video.

DETAILED DESCRIPTION OF THE PREFERRED EMBODIMENT

Figure 1:
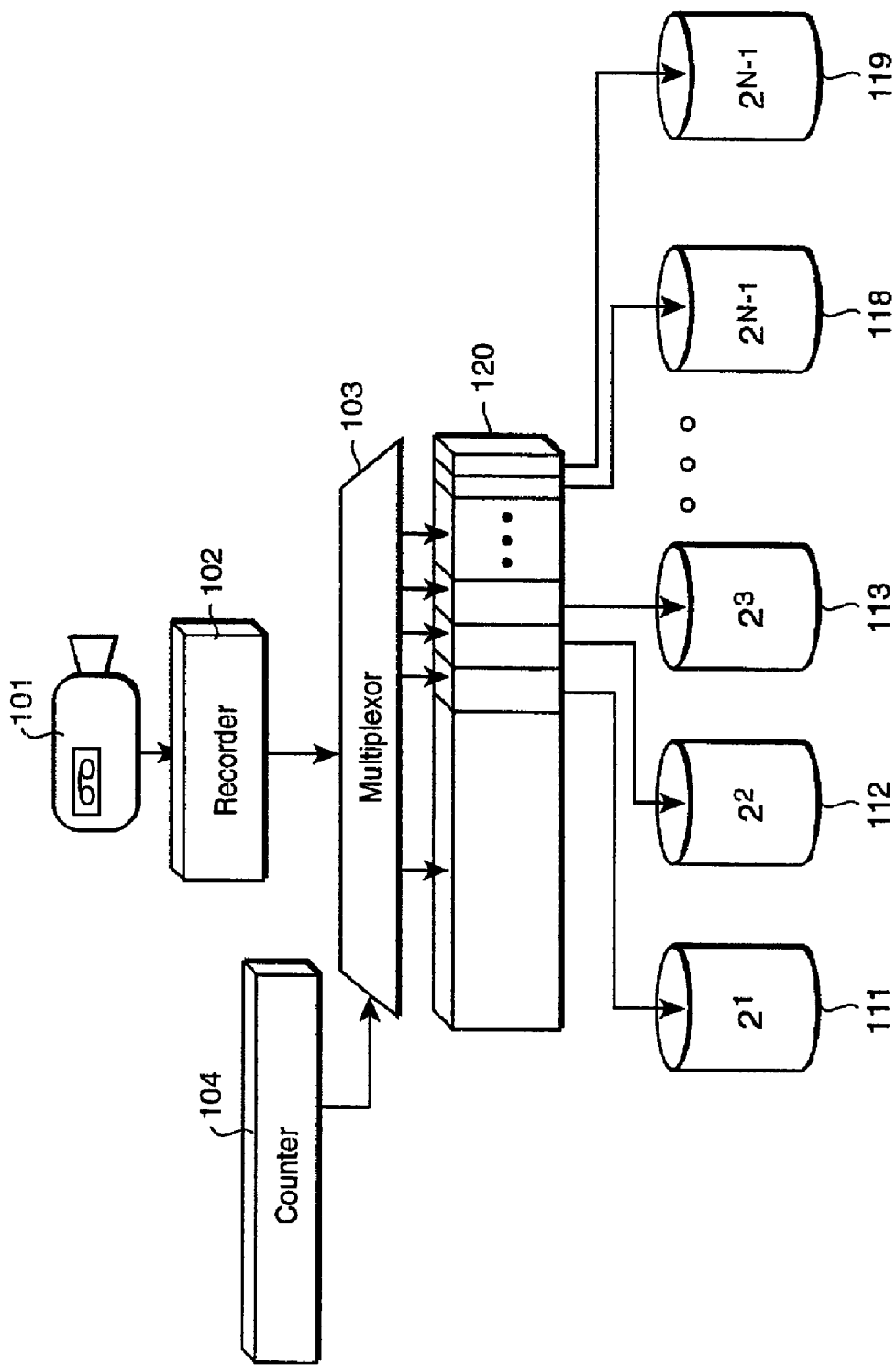
FIG. 1 is a block diagram of the video recording system with exponential storage according to the invention.

The storage system and method according to my invention utilizes an exponential storage decay strategy that allows sequential access and arbitrary frame sizes, and only stores a single copy of each frame in a video.

As shown in FIG. 1, the system 100 according to my invention includes at least one video camera 101, a video recorder 102, and multiple circular storage buffers 111–119, preferably disks. Buffer 1 (111) sequentially records every other frame. Buffer 2 (112) sequentially records every 4th frame. Buffer 3 (113) sequentially records every eighth frame., Buffers N-1 and N (118–119) sequentially records every N-1th frame. In general, Buffer k records every $2^k$th frame, except the last two buffers which record every $2^{N-1}$ frames. Table A below shows how this would work for N=4.

TABLE A

| Buffer | Recorded frames | | | | | | | | | |
|---|---|---|---|---|---|---|---|---|---|---|
| Buffer1 | 1 | 3 | 5 | 7 | 9 | 11 | 13 | 15 | 17 | 19 ... |
| Buffer2 | 2 | 6 | 10 | 14 | 18 | 22 | 26 | 30 | 34 | 38 ... |
| Buffer3 | 4 | 12 | 20 | 28 | 36 | 44 | 52 | 60 | 68 | 76 ... |
| Buffer4 | 8 | 16 | 24 | 32 | 40 | 48 | 56 | 64 | 72 | 80 ... |

Note there is exactly one copy of each recorded frame. The writes are completely sequential within each buffer. Although this can still cause some head movement, the head movement can be minimized by using intermediate RAM cache buffers 120, one for each disk buffer.

As an advantage of my invention, images of different sizes do not pose a problem. Because each disk buffer is circular, a new frame always overwrites the oldest frame or frames when the buffer is full. If a new frame is larger than the oldest frame, then more than one frame may be overwritten, but this has minor consequences. Even with equal size buffers, there may be different numbers of frames in each buffer, due to the different sizes of the frames. However, this only changes boundaries on time-resolution break points. Note also that the different disk buffers can store a different number of frames, again, also due to variable frame sizes. But, on the average, the number of frames in each buffer should be approximately the same.

This methodology enables a high-temporal resolution record for recent recorded events, and a low-temporal resolution record of the distant past. If Buffer 0 records T days of events at a full frame rate, then N buffers allow access to approximately $2^{(N)}*$ T/N total days, with temporal resolutions of:

2 T/N days for the full frame rate,

2 T/N additional days for the ½ frame rate,

4 T/N additional days for the ¼ frame rate, and $2^{(N-1)}*$ T/N additional days for ½ (N−1) frame rate.

For example, 20 days of a conventional, full frame-rate record spread over in five equal size buffers gives 8 days at the full frame rate, 16 days at the half frame rate, 32 days at the quarter frame, and 64 days at ⅛th frame rate.

It should be noted that the method according to the invention can use bases other than two, or a different progression of bases and exponents, for example $3^0$, $4^3$, so one can use many different data decay rates.

For example, Table B shows the recorded frames five buffers.

TABLE B

| Buffer | Recorded frames | | | | | | | | | |
|---|---|---|---|---|---|---|---|---|---|---|
| Buffer1 | 1 | 2 | 4 | 5 | 7 | 8 | 10 | 11 | 13 | 14 . . . |
| Buffer2 | 3 | 6 | 12 | 15 | 21 | 24 | 30 | 33 | 39 | 42 . . . |
| Buffer3 | 9 | 18 | 36 | 45 | 63 | 72 | 90 | 99 | 117 | 126 . . . |
| Buffer4 | 27 | 54 | 108 | 135 | 189 | 216 | 270 | 294 | 348 | 375 . . . |
| Buffer5 | 81 | 162 | 243 | 324 | 405 | . . . | | | | |

This table drops every third frame from the first buffer, placing those in the second buffer except every third, which goes in the third, and so on. The final buffer just fills in the missing gaps in the penultimate one, and hence is half the size for this base-3 version. In fact, a consistent base is not required from buffer to buffer, so one can easily fashion many different data decay rates. The thing to note here is how quickly higher powers extend the coverage time with a small number of buffers, at the expense of temporal resolution.

While my system is primarily intended for use with surveillance applications, it is quite generic and can find use in other applications. For example, so called "black boxes" in commercial planes could use my system to give longer historical views. It should also be noted that the storage device need not be a hard disk as any sequentially accessible storage medium can greatly benefit from my invention. In particular, the present method is well suited for recording in continuous magnetic tapes and bubble memories. It is even possible to construct a video surveillance system that used my method with multiple analog time-lapse VCRs.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A system for recording a sequence of frames of a video, comprising:

a plurality of circular buffers, each buffer configured to store the frames in a sequential order;

means for selecting a plurality of disjoint sets of frames from the video, there being one set of frames selected for each buffer such that a first set selects a first fraction of the frames, each subsequent set of frames being a smaller fraction then a previous set of frames, and a last set of selected frames including remaining frames; and means for sequentially storing each set of frames in a corresponding buffer.

2. The system of claim 1 wherein the circular buffers are disk buffers.

3. The system of claim 1 wherein a most recent one of the frames overwrites an oldest one of the frames in a particular buffer when the particular buffer is full.

4. The system of claim 2 further comprising:

a cache buffer associated with each disk buffer, and wherein the frames are first stored to a corresponding cache buffer, and the cache buffer is written to the associated disk buffer when the corresponding cache buffer is full.

5. The system of claim 1 wherein each fraction is an integer power of two.

6. The system of claim 1 wherein the video is a time-lapse sequence of frames.

7. A method for recording a sequence of frames of a video, comprising the steps of:

selecting a plurality of disjoint sets of frames from the video, there being one set of frames selected for each buffer such that a first set selects a first fraction of the frames, each subsequent set of frames being a smaller fraction then a previous set of frames, and a last set selected frames including a remaining set of frames; and storing, sequentially, each set of frames in a corresponding buffer.

* * * * *